(12) United States Patent
Kim et al.

(10) Patent No.: US 11,844,737 B2
(45) Date of Patent: Dec. 19, 2023

(54) WEARABLE MUSCULAR STRENGTH ASSISTING APPARATUS

(71) Applicants: Hyundai Motor Company, Seoul (KR); Kia Motors Corporation, Seoul (KR)

(72) Inventors: Beom Su Kim, Gyeonggi-do (KR); Seok Ryung Kwon, Seoul (KR); Kyu Jung Kim, Seoul (KP); Hyun Seop Lim, Gyeonggi-do (KR); Ki Hyeon Bae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 508 days.

(21) Appl. No.: 16/997,371

(22) Filed: Aug. 19, 2020

(65) Prior Publication Data

US 2021/0275379 A1    Sep. 9, 2021

(30) Foreign Application Priority Data

Mar. 9, 2020    (KR) ......................... 10-2020-0029113

(51) Int. Cl.
| | |
|---|---|
| *A61H 1/02* | (2006.01) |
| *B25J 9/00* | (2006.01) |
| *B25J 9/10* | (2006.01) |

(52) U.S. Cl.
CPC ......... *A61H 1/0274* (2013.01); *A61H 1/0281* (2013.01); *A61H 1/0285* (2013.01);
(Continued)

(58) Field of Classification Search
CPC .. A61H 1/0274; A61H 1/0281; A61H 1/0285; A61H 2201/1671;
(Continued)

(56) References Cited

U.S. PATENT DOCUMENTS

| | | | |
|---|---|---|---|
| 2013/0237883 A1* | 9/2013 | Malosio | ............... A61H 1/0281 601/33 |
| 2017/0189257 A1* | 7/2017 | Lan | ..................... A63B 21/4017 |

FOREIGN PATENT DOCUMENTS

| | | | | |
|---|---|---|---|---|
| CN | 105662783 A | * | 6/2016 | |
| CN | 107669442 A | * | 2/2018 | ........... A61H 1/0274 |

(Continued)

OTHER PUBLICATIONS

English translation for CN 108144264, machine translated by Search Clarivate Analytics, translated on May 15, 2023.*

(Continued)

*Primary Examiner* — Tu A Vo
(74) *Attorney, Agent, or Firm* — Fox Rothschild LLP

(57) ABSTRACT

A wearable muscular strength assisting apparatus includes a base configured to be positioned on a wearer and extending vertically, a link unit, which is configured to be positioned so as to be laterally spaced apart from the base and is configured to be connected to the wearer's upper arm, front arm or hand, a first connector, which is rotatably coupled at one end thereof to the base and extends laterally and which is rotatably coupled at a remaining end thereof to the link unit so as to connect the link unit to the base, and a second connector, which is rotatably coupled at one end thereof to the base, and extends laterally and which is rotatably coupled at a remaining end thereof to the link unit so as to connect the link unit to the base.

10 Claims, 4 Drawing Sheets

(52) U.S. Cl.
CPC ........... *B25J 9/0006* (2013.01); *B25J 9/0009* (2013.01); *B25J 9/106* (2013.01); *A61H 2201/0192* (2013.01); *A61H 2201/1215* (2013.01); *A61H 2201/165* (2013.01); *A61H 2201/1638* (2013.01); *A61H 2201/1671* (2013.01)

(58) Field of Classification Search
CPC ...... A61H 2201/1215; A61H 2201/149; A61H 2201/1638; A61H 2201/165; B25J 9/0006; B25J 9/0009; B25J 9/106
See application file for complete search history.

(56) References Cited

FOREIGN PATENT DOCUMENTS

| | | | | | |
|---|---|---|---|---|---|
| CN | 108144264 A | * | 6/2018 | ........... | A61H 1/0274 |
| CN | 110664583 A | * | 1/2020 | | |
| KR | 10-2017-0043116 A | | 4/2017 | | |
| WO | WO-2011142546 A2 | * | 11/2011 | ......... | A61H 23/0254 |

OTHER PUBLICATIONS

English translation for CN 107669442, machine translated by Search Clarivate Analytics, translated on May 15, 2023.*
English translation for CN 110664583, machine translated by Search Clarivate Analytics, translated on Aug. 8, 2023.*
English translation for CN 105662783, machine translated by Search Clarivate Analytics, translated on Aug. 8, 2023.*

* cited by examiner

WEARABLE MUSCULAR STRENGTH ASSISTING APPARATUS

CROSS-REFERENCE TO RELATED APPLICATION

This application claims under 35 U.S.C. § 119(a) the benefit of Korean Patent Application No. 10-2020-0029113, filed on Mar. 9, 2020 in the Korean Intellectual Property Office, the entire contents of which are incorporated herein by reference.

BACKGROUND

1. Technical Field

The present disclosure relates to a wearable muscular strength assisting apparatus, more particularly, to the wearable muscular strength assisting apparatus that is configured to be worn on an upper limb of a wearer's body and which simulates the motion of the wearer's shoulder to assist muscular strength of an upper limb.

2. Description of the Related Art

In general, a wearable robot, which assists motion of the wearer's body by being worn on a specific portion of the body or by accommodating a specific portion of the body, has been designed for medical purposes, military purposes or work assisting purposes. Particularly, a wearable working robot is designed to prevent injury to a wearer and to assist the wearer's muscular strength by reducing the load applied to the wearer's body. Such a wearable robot is constructed to simulate the wearer's outer skeleton. In such a wearable robot, it is technically essential to design joints so as to implement the same motion as actual motion of a human body.

Particularly, a muscular strength assisting apparatus for a wearable upper arm typically includes a manual support apparatus configured to assist a human body supporting the load of a tool. For example, the manual support apparatus may be constructed so as to compensate for gravity within a positional range using a combination of components, springs, cables and pulleys. In particular, such an apparatus is constructed so as to compensate for gravity within a limited motion range.

Details described as the background art are intended merely for the purpose of promoting the understanding of the background of the present disclosure and should not be construed as an acknowledgment of the prior art that is previously known to those of ordinary skill in the art.

SUMMARY

Therefore, the present disclosure provides a wearable muscular strength assisting apparatus in which a drive unit and a plurality of links are coupled to each other so as to simulate the outer skeleton of a wearer's shoulder blade and thus to simulate the motion of the wearer's shoulder blade, thereby assisting muscular strength of the wearer's upper limb.

In accordance with the present disclosure, the above and other objects can be accomplished by the provision of a wearable muscular strength assisting apparatus including a base, which is configured to be positioned on a wearer (e.g., a rear surface such as the wearer's shoulder joint) and extending vertically, a link unit, which is positioned so as to be laterally spaced apart from the base and is connected to a wearer's upper arm, front arm or hand, a first connector, which is rotatably coupled at one end thereof to the base and extends laterally and which is rotatably coupled at a remaining end thereof to the link unit so as to connect the link unit to the base, and a second connector, which is rotatably coupled at one end thereof to the base at a position, which is vertically spaced apart from the one end of the first connector, and extends laterally and which is rotatably coupled at a remaining end thereof to the link unit so as to connect the link unit to the base.

Each of the first and second connectors may be configured to have a C shape, which is concave upwards, and may be connected at the one end and the remaining end thereof.

The wearable muscular strength assisting apparatus may further include a coupler link, which is integrally formed with the link unit and extends downwards therefrom and which is rotatably coupled both to the remaining end of the first connector and to the remaining end of the second connector.

The wearable muscular strength assisting apparatus may further include a drive unit fixed to the base and including a rotational member, which is rotated about an actuation rotational shaft, which extends in an anteroposterior direction, during actuation of the drive unit, and a connecting rod, which is rotatably coupled to the rotational member and is rotatably coupled at a remaining end thereof to the coupler link.

The coupler link may be rotatably coupled to the connecting rod at a position which is spaced apart from a rotational shaft at which the remaining end of the first connector and the link unit are connected to each other.

The remaining end of the first connector and the remaining end of the second connector may be rotatably coupled to the coupler link at rotational shafts, which are spaced apart from each other, and the first and second connectors may be rotated by actuation of the drive unit.

The first connector may be positioned in front of the drive unit and the connecting rod and the second connector may be positioned behind the drive unit and the connecting rod so as to connect the link unit to the base.

A wearer's shoulder blade may be rotated by rotation of the link unit caused by the drive unit.

The wearable muscular strength assisting apparatus may further include a height adjuster, which extends upwards from a ground and is connected at an upper end thereof to the base and which is coupled to the base so as to be slid vertically.

The link unit may include a shoulder part, which is coupled at one end thereof to the first and second connectors and extends outwards therefrom, an upper arm support, which is rotatably coupled at an upper end thereof to a remaining end of the shoulder part and extends in a direction parallel to a wearer's upper arm, and a front arm support, which is rotatably coupled at an upper end thereof to a lower end of the upper arm support and extends in a direction parallel to a wearer's front arm.

The front arm support may be provided at a lower end thereof with a handle, which extends toward an inside from an outside of the wearer, and, when the handle is connected to a wearer's hand, the link unit may be connected to the wearer.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
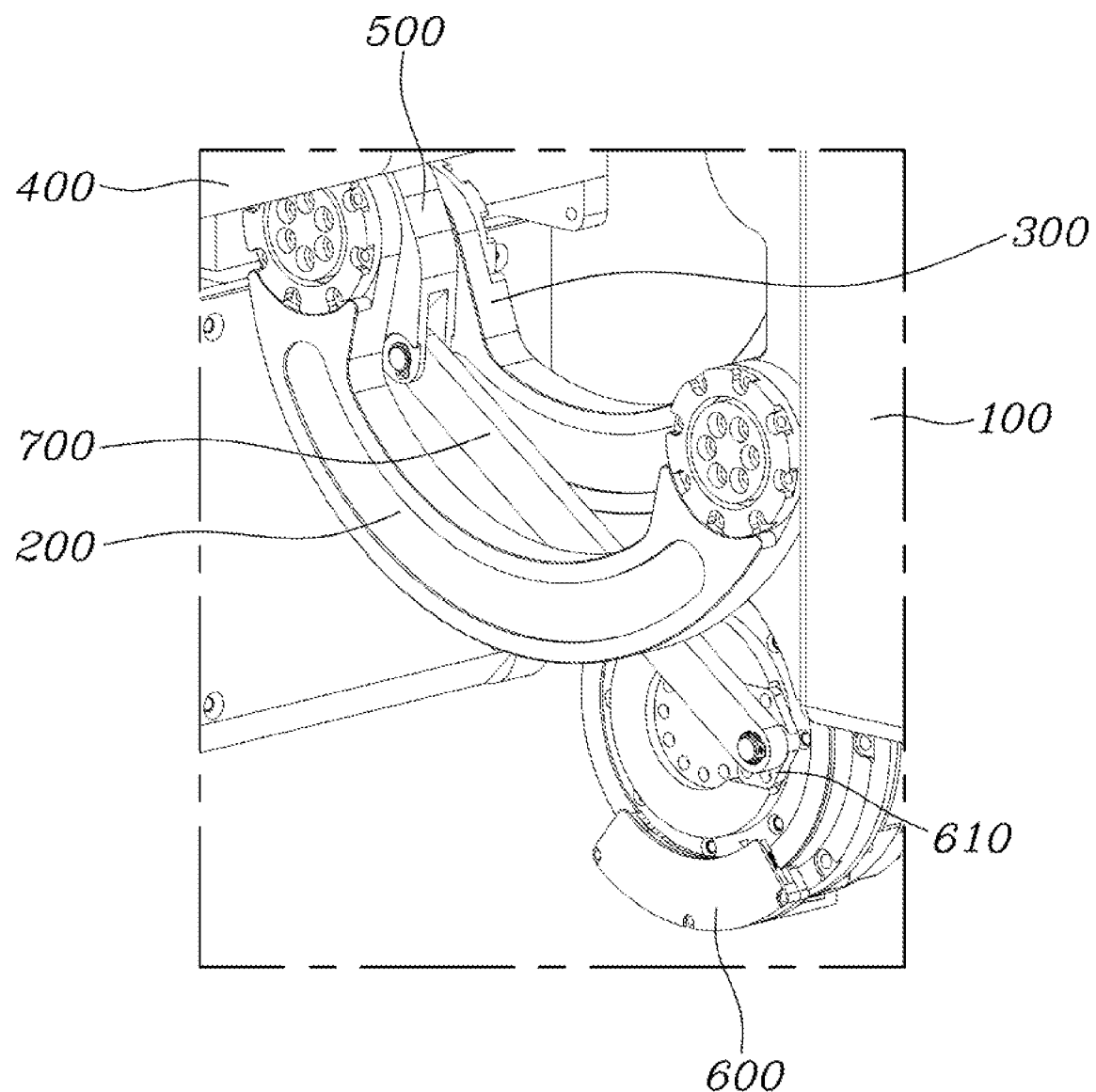
FIG. 1 is a perspective view illustrating a shoulder blade region of a wearable muscular strength assisting apparatus according to an embodiment of the present disclosure.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof. It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be understood in the same way.

Unless otherwise defined, all terms including technical and scientific terms used herein have the same meaning as those commonly understood by one of ordinary skill in the art to which this disclosure belongs. It will be further understood that terms, such as those defined in commonly used dictionaries, should be interpreted as having meanings consistent with their meaning in the context of the relevant art and the present disclosure, and are not to be interpreted in an idealized or overly formal sense unless expressly so defined herein.

Hereinafter, exemplary embodiments of the present disclosure will be described in detail with reference to the accompanying drawings. Throughout the drawings, the same reference numerals will refer to the same or like parts.

Figure 2:
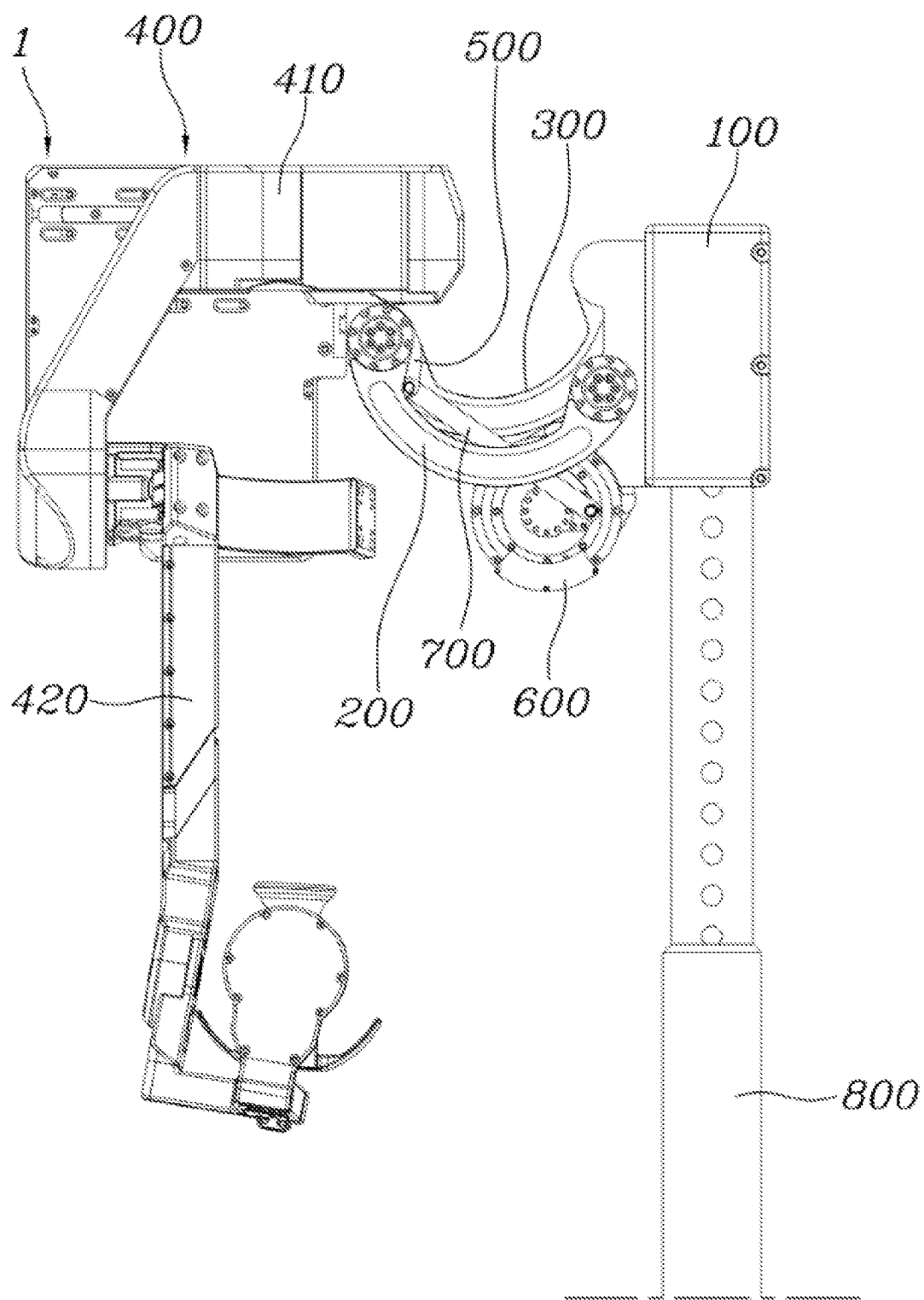
FIG. 2 is a front view illustrating the shoulder blade region of the wearable muscular strength assisting apparatus according to the embodiment of the present disclosure.
Figure 3:
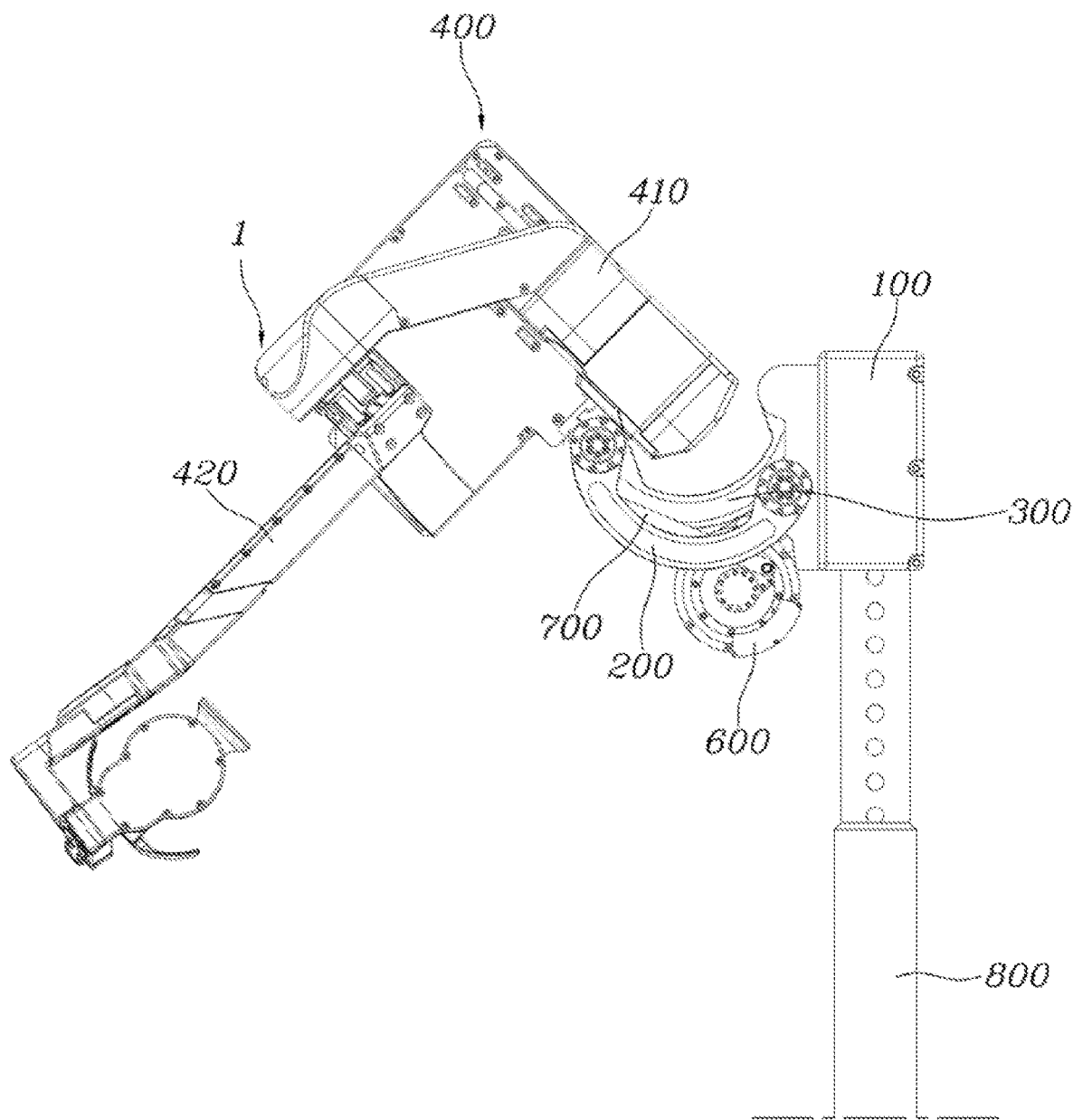
FIG. 3 is a front view illustrating the wearable muscular strength assisting apparatus according to the embodiment of the present disclosure when a drive unit is operated to the maximum extent.
Figure 4:
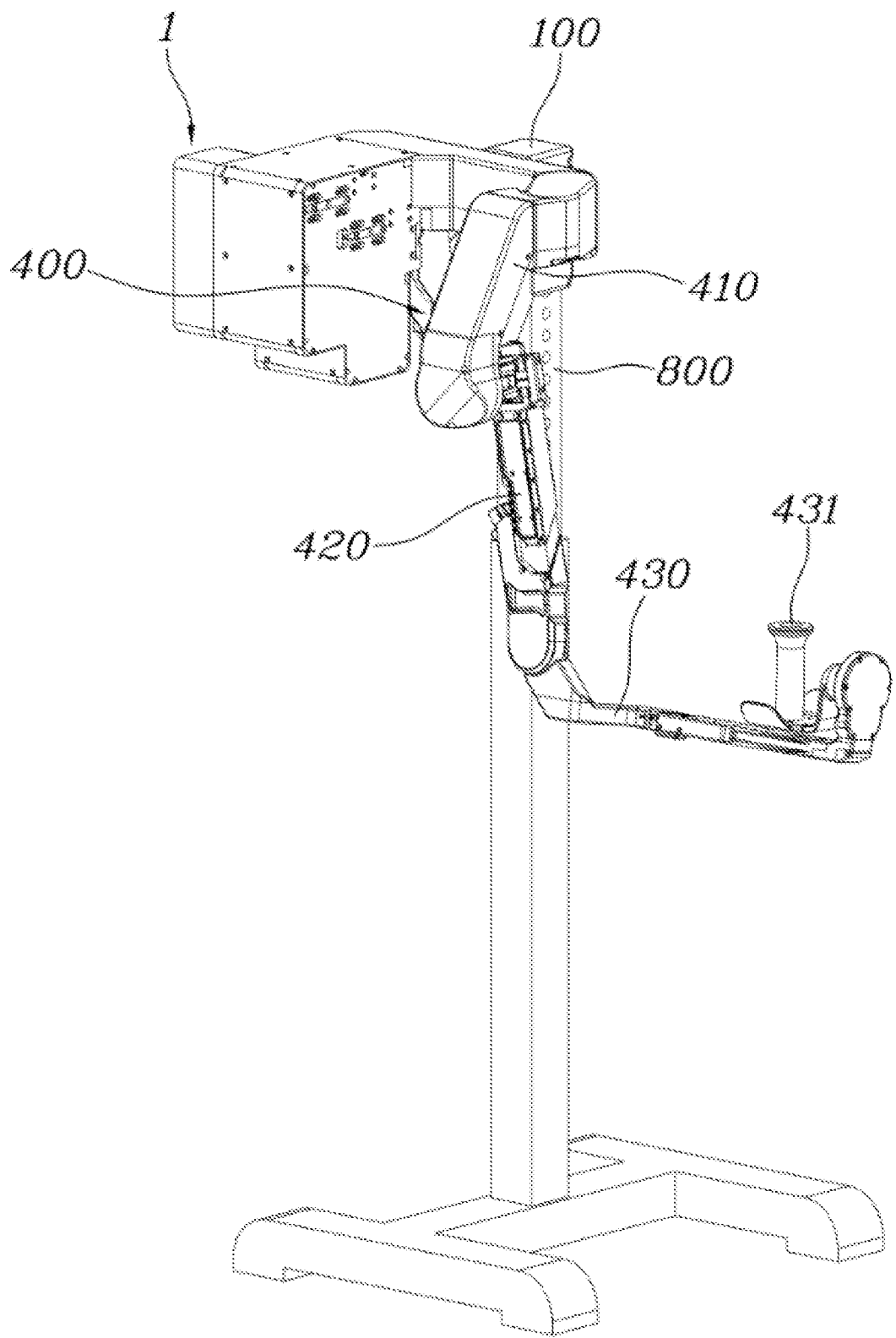
FIG. 4 is a perspective of the entire structure of the wearable muscular strength assisting apparatus according to the embodiment of the present disclosure.

FIG. 1 is a perspective view illustrating a shoulder blade region of a wearable muscular strength assisting apparatus 1 according to an embodiment of the present disclosure. FIG. 2 is a front view illustrating the shoulder blade region of the wearable muscular strength assisting apparatus 1 according to the embodiment of the present disclosure. FIG. 3 is a front view illustrating the wearable muscular strength assisting apparatus 1 according to the embodiment of the present disclosure when a drive unit is operated to the maximum extent. FIG. 4 is a perspective of the entire structure of the wearable muscular strength assisting apparatus 1 according to the embodiment of the present disclosure.

Hereinafter, the wearable muscular strength assisting apparatus 1 according to an embodiment of the present disclosure will be described with reference to FIGS. 1 to 4. In the case of the embodiment of the present disclosure, "a one end" and "a remaining end" represents a case where "a one side" and "a remaining side" are applied, respectively.

The wearable muscular strength assisting apparatus 1 according to the embodiment of the present disclosure includes a base 100, which is configured to be positioned on a wearer and extends vertically, a link unit 400, which is positioned so as to be spaced apart from the base 100 and preferably is configured to be connected to the wearer's upper arm, front arm or hand, a first connector 200, which is rotatably coupled at one end thereof to the base 100 and extends laterally and which is rotatably coupled to the link unit 400 so as to connect the link unit 400 to the base 100, and a second connector 300, which is rotatably coupled at one end thereof to the base 100 at a position, which is vertically spaced apart from the one end of the first connector 200, and extends laterally and which is rotatably coupled at the other end thereof to the link unit 400, thereby connecting the link unit 400 to the base 100.

Referring to FIG. 1, the base 100 is configured so as to be positioned at the center of the wearer's back and to extend vertically, and the first connector 200 and the second connector 300, which are rotatably coupled to the base 100, are positioned at a wearer's shoulder blade. The one end of the first connector 200 and the one end of the second connector 300 are positioned at the base 100 in the state of being vertically spaced apart from each other, and the other end of the first connector 200 and the other end of the second connector 300 are rotatably coupled to the link unit 400, thereby enabling the apparatus to simulate the motion in which a wearer's shoulder blade is rotated outwards.

The link unit 400, which is connected both to the other end of the first connector 200 and to the other end of the second connector 300, is connected to wearer's shoulder, upper arm and front arm so as to be rotated according to rotation of the wearer's shoulder, upper arm and front arm. The joints of the link unit 400 may be provided with respective power units in order to assist wearer's muscular strength when the wearer's shoulder, upper arm and front arm are rotated.

Each of the first connector 200 and the second connector 300 is configured to have a C shape, which is concave upwards, and is connected at the two ends thereof to the corresponding ones.

When the link unit 400, which is coupled both to the other end of the first connector 200 and to the other end of the second connector 300, is rotated, the upper part of the link unit 400 faces toward the first connector 200 and the second connector 300, and the link unit 400 may interfere with the first connector 200 and the second connector 300 in the rotational range of the first connector 200 and the second connector 300.

In order to avoid the interference of the link unit 400 with the first connector 200 and the second connector 300 in the rotational range of the first connector 200 and the second connector 300 during rotation of the link unit 400, each of the first connector 200 and the second connector 300 is configured to have a C shape, which is concaved upwards, and is connected at the two ends thereof to the corresponding ones.

The wearable muscular strength assisting apparatus 1 further includes a coupler link 500, which is connected to the link unit 400 and extends downwards therefrom and which is rotatably coupled both to the other end of the first connector 200 and to the other end of the second connector 300.

The coupler link 500 is configured to be positioned on the wearer (e.g., at the rear surface of a wearer's shoulder joint), and is rotatably coupled both the other end of the first connector 200 and to the other end of the second connector 300 so as to connect the link unit 400 both to the first connector 200 and to the second connector 300.

The wearable muscular strength assisting apparatus 1 according to the embodiment of the present further includes a drive unit 600, which is fixed to the base 100 and which has a rotational member 610 configured to be rotated about an actuation rotational shaft, which extends forwards, and a connecting rod 700, which is rotatably coupled at one end thereof to the rotational member 610 and at the other end thereof to the coupler link 500.

The drive unit 600 may be connected to a power source, such as a motor, so as to receive the power. The drive unit 600 includes the rotational member 610 configured to have a circular shape. The rotational member 610 is rotated about the rotational shaft, which extends in the forward direction of a wearer. The connecting rod 700, which is configured to be linear, is rotatably connected at one end thereof to the rotational member 610 so as to be moved by rotation of the rotational member 610, and is rotatably coupled at the other end thereof to the end of the coupler link 500 so as to transmit the power from the drive unit 600 to the link unit 400.

The rotational member 610 of the drive unit 600 may be rotated clockwise or counterclockwise within a range of about 120 degrees so as to rotate the connecting rod 700, according to the setup.

The coupler link 500 is rotatably coupled to the connecting rod 700 at a position, which is spaced apart from the rotational shaft at which the other end of the first connector 200 is connected to the link unit 400.

The coupler link 500 is rotatably coupled to the connecting rod 700 at a position which is spaced apart from the rotational shaft connected to the other end of the first connector 200. Consequently, it is possible to rotate the link unit 400 upwards or downwards via the connecting rod 700, which is rotated by the actuation of the drive unit 600. Therefore, it is possible to cause the motion according to the outward rotation of a wearer's shoulder blade.

The other end of the first connector 200 and the other end of the second connector 300 are rotatably coupled to the coupler link 500 at rotational axes, which are spaced apart from each other, and the first connector 200 and the second connector 300 are rotated by the actuation of the drive unit 600.

Since the other end of the first connector 200 and the other end of the second connector 300 are rotatably coupled to the coupler link 500 at rotational axes, which are spaced apart from each other, the link unit 400 is rotated along the rotational orbit, which is drawn by the other ends of the first and second connectors 200 and 300 when the link unit 400 is moved upwards by the coupler link 500. Furthermore, since the one end of the first connector 200 and the one end of the second connector 300 are rotatably connected to the base 100 in the state of being spaced apart from each other and since the other end of the first connector 200 and the other end of the second connector 300 are rotatably coupled to the rotational axes, which are spaced apart from each other, there is an effect of simulating the motion in which a wearer's shoulder blade is rotated about a plurality of rotational axes.

The first connector 200 and the second connector 300 connect the link unit 400 to the base 100 in the state in which the first connector 200 is positioned in front of the drive unit 600 and the connecting rod 700 and the second connector 300 is positioned behind the drive unit 600 and the connecting rod 700.

Furthermore, since the first connector 200 and the second connector 300 are coupled to the coupler link 500 in the state in which the first connector 200 is positioned in front of the drive unit 600, the connecting rod 700 and the coupler link 500 and the second connector 300 is positioned behind the drive unit 600, the connecting rod 700 and the coupler link 500, it is possible to increase strength of the coupling therebetween. In addition, the connecting rod 700, the coupler link 500 and the link unit 400 are rotated by actuation of the drive unit 600 without interference therebetween in the rotational range thereof.

As the link unit 400 is rotated by the drive unit 600, a wearer's shoulder blade is rotated.

The link unit 400 may be connected to wearer's shoulder, upper arm and front arm. By the actuation of the drive unit 600, the connecting rod 700 connected to the rotational member 610 is rotated, and thus the coupler link 500 connected to the connecting rod 700 causes rotation of the link unit 400.

Accordingly, the wearer's upper arm and front arm may be rotated upwards about his/her shoulder. As the wearer's shoulder is lifted, the wearer's shoulder blade may be rotated outwards.

Therefore, when a wearer's shoulder or shoulder blade is injured, there is an effect of assisting muscular strength of the wearer and thus of promoting the rehabilitation of the injured region during rotation of the shoulder and the shoulder blade.

The wearable muscular strength assisting apparatus 1 according to the embodiment of the present disclosure further includes a height adjuster 800, which is disposed at the lower end thereof at the ground and extends vertically and which connected at the upper end thereof to the base 100 and is coupled to the base 100 so as to be slid vertically.

The height adjuster 800 may be provided with a support, which is placed on the ground. The height adjuster 800 may have a plurality of through holes, which are formed through the middle part thereof at regular intervals, and the base 100 may include a pin, which is fitted and held in one of the through holes in the height adjuster 800. By virtue of the height adjuster 800, it is possible to adjust the height of the wearable muscular strength assisting apparatus 1 according to the body height of a wearer and to assist so as to enable the wearable muscular strength assisting apparatus to be worn on the wearer and to assist the muscular strength of the wearer's upper limb.

The link unit 400 includes a shoulder part 410, which is coupled at one end thereof both to the first connector 200 and to the second connector 300 and which extends outwards, an upper arm support 420, which is rotatably coupled to the other end of the shoulder part 410 and extends in a direction parallel to the wearer's upper arm, and a front arm support 430, which is rotatably coupled at the upper end thereof to the lower end of the upper arm support 420 and extends in a direction parallel to the wearer's front arm.

In the link unit 400, the shoulder part 410 is connected to the wearer's shoulder, the upper arm support 420 is connected to the wearer's upper arm, and the front arm support 430 is connected to the wearer's front arm. Each of the connected portions among the shoulder part 410, the upper arm support 420 and the front arm support 430 may be provided with a power unit. As a result, it is possible to assist the muscular strength of the wearer's upper limb.

The front arm support 430 is provided at the lower end thereof with a handle part 431, which extends in an inward direction of the wearer's front arm. After the handle part 431 is connected to the wearer's hand, the link unit 400 is connected to the wearer.

The wearer may grasps the handle part 431 formed at the lower end of the front arm support 430, and may then wears the wearable muscular strength assisting apparatus 1, thereby making it possible to obtain assistance to his/her muscular strength during movement of the wearer's upper limb. Furthermore, the wearable muscular strength assisting apparatus 1 may be provided with a connection part capable of be connected to the wearer's front arm or upper arm, in addition to the handle part 431 if necessary.

As is apparent from the above description, the wearable muscular strength assisting apparatus according to the present disclosure is constructed such that the base, which extends vertically at a wearer's back, and the link unit, which supports the wearer's shoulder, upper arm and front arm, are connected to each other via the first connector and the second connector, and the drive unit, which includes the rotational member provided at the base, and the connecting link, which is connected to the rotational member, are connected to the coupler link provided in the link unit, thereby transmitting the power from the drive unit to the link unit. Accordingly, the present disclosure offers an effect of assisting the muscular strength of the wearer during rotation of the wearer's shoulder blade while simulating the rotational motion of the wearer's shoulder blade.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A wearable muscular strength assisting apparatus comprising:
    a base, which is configured to be positioned on a wearer and extending vertically;
    a link unit, which is positioned so as to be laterally spaced apart from the base and is configured to be connected to the wearer's upper arm, front arm or hand;
    a first connector, which is rotatably coupled at one side thereof to the base and extends laterally and which is rotatably coupled at a remaining side thereof to the link unit so as to connect the link unit to the base; and
    a second connector, which is rotatably coupled at one side thereof to the base at a position, which is vertically spaced apart from the one side of the first connector, and extends laterally and which is rotatably coupled at a remaining side thereof to the link unit so as to connect the link unit to the base;
    wherein each of the first and second connectors is a single piece member in a C shape concave upwards when the wearable muscular strength assisting apparatus is in an upright position;
    wherein an entire shape of the single piece member in a C shape concave upwards of each of the first and second connectors is continuous and fixed; and
    wherein a rotational axis of the second connector and the base is being vertically offset from a rotational axis of the first connector and the base when the wearable muscular strength assisting apparatus is in the upright position.

2. The wearable muscular strength assisting apparatus according to claim 1, further comprising a coupler link, which is integrally formed with the link unit and extends downwards therefrom and which is rotatably coupled both to the remaining side of the first connector and to the remaining side of the second connector.

3. The wearable muscular strength assisting apparatus according to claim 2, further comprising:
    a drive unit fixed to the base and including a rotational member, which is rotated about an actuation rotational shaft, which extends in an anteroposterior direction, during actuation of the drive unit; and
    a connecting rod, which is rotatably coupled to the rotational member and is rotatably coupled at a remaining side thereof to the coupler link.

4. The wearable muscular strength assisting apparatus according to claim 3, wherein the coupler link is rotatably coupled to the connecting rod at a position which is spaced apart from a rotational shaft at which the remaining side of the first connector and the link unit are connected to each other.

5. The wearable muscular strength assisting apparatus according to claim 3, wherein the remaining side of the first connector and the remaining side of the second connector are rotatably coupled to the coupler link at rotational shafts, which are spaced apart from each other, and the first and second connectors are rotated by actuation of the drive unit.

6. The wearable muscular strength assisting apparatus according to claim 3, wherein the wearer's shoulder blade is configured to be rotated by rotation of the link unit caused by the drive unit.

7. The wearable muscular strength assisting apparatus according to claim 1, further comprising a height adjuster, which extends upwards from a ground and is connected at an upper end thereof to the base and which is coupled to the base so as to be slid vertically.

8. The wearable muscular strength assisting apparatus according to claim 1, wherein the link unit comprises:
 a shoulder part, which is coupled at one side thereof to the first and second connectors and extends outwards therefrom;
 an upper arm support, which is rotatably coupled at an upper end thereof to a remaining side of the shoulder part and extends in a direction parallel to the wearer's upper arm; and
 a front arm support, which is rotatably coupled at an upper end thereof to a lower end of the upper arm support and extends in a direction parallel to the wearer's front arm.

9. The wearable muscular strength assisting apparatus according to claim 8, wherein the front arm support is provided at a lower end thereof with a handle, which extends toward an inside from an outside of the wearer, and
 wherein, when the handle is connected to the wearer's hand, the link unit is connected to the wearer.

10. A wearable muscular strength assisting apparatus comprising:
 a base, which is configured to be positioned on a wearer and extending vertically;
 a link unit, which is positioned so as to be laterally spaced apart from the base and is configured to be connected to the wearer's upper arm, front arm or hand;
 a first connector, which is rotatably coupled at one side thereof to the base and extends laterally and which is rotatably coupled at a remaining side thereof to the link unit so as to connect the link unit to the base;
 a second connector, which is rotatably coupled at one side thereof to the base at a position, which is vertically spaced apart from the one side of the first connector, and extends laterally and which is rotatably coupled at a remaining side thereof to the link unit so as to connect the link unit to the base;
 a coupler link, which is integrally formed with the link unit and extends downwards therefrom and which is rotatably coupled both to the remaining side of the first connector and to the remaining side of the second connector,
 a drive unit fixed to the base and including a rotational member, which is rotated about an actuation rotational shaft, which extends in an anteroposterior direction, during actuation of the drive unit;
 a connecting rod, which is rotatably coupled to the rotational member and is rotatably coupled at a remaining side thereof to the coupler link; and
 wherein the first connector is positioned in front of the drive unit and the connecting rod, the second connector is positioned behind the drive unit and the connecting rod so as to connect the link unit to the base.

* * * * *